(12) United States Patent
Lee et al.

(10) Patent No.: US 7,372,796 B2
(45) Date of Patent: May 13, 2008

(54) APPARATUS FOR CONTROLLING MONITOR PHOTO DIODE IN OPTICAL PICKUP SYSTEM

(75) Inventors: Jun-hyuk Lee, Gyeonggi-do (KR); Chui-ho Jeon, Gyeonggi-do (KR); Dong-ryul Lee, Seoul (KR); Sung-du Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 509 days.

(21) Appl. No.: 10/687,994

(22) Filed: Oct. 20, 2003

(65) Prior Publication Data

US 2004/0081041 A1    Apr. 29, 2004

(30) Foreign Application Priority Data

Oct. 24, 2002   (KR) ............... 10-2002-0065182

(51) Int. Cl.
*G11B 5/09* (2006.01)
(52) U.S. Cl. ............... 369/59.15; 369/59.11; 369/59.13
(58) Field of Classification Search ........ None
See application file for complete search history.

(56) References Cited

U.S. PATENT DOCUMENTS 5,197,059 A    3/1993  Minami et al. ........ 369/116
5,742,566 A *  4/1998  Imai .................... 369/13.54
7,057,990 B1* 6/2006  Seo .................... 369/47.52
7,068,933 B2* 6/2006  Seong et al. ........... 398/33
2002/0101808 A1* 8/2002  Seo .................... 369/59.11

FOREIGN PATENT DOCUMENTS

JP    8249701          9/1996
KR    1020010077597    8/2002

OTHER PUBLICATIONS

Korean Office Action.

* cited by examiner

*Primary Examiner*—William Korzuch
*Assistant Examiner*—Tawfik Goma
(74) *Attorney, Agent, or Firm*—Staas & Halsey LLP (57) ABSTRACT

An apparatus for controlling a monitor photo diode (PD) of an optical pickup system monitors an optical power signal output for writing data on or reading data from a disk. The apparatus includes a comparator which compares a voltage signal corresponding to the optical power signal output from the LD with a predetermined reference voltage signal, and a gain selector which selectively issues a gain output from the comparator depending on the type of the optical power signal output from the LD.

9 Claims, 5 Drawing Sheets

FIG. 1 (PRIOR ART)

FIG. 2A (PRIOR ART) WRITE POWER INPUT

FIG. 2B (PRIOR ART) FPD OUTPUT

APPARATUS FOR CONTROLLING MONITOR PHOTO DIODE IN OPTICAL PICKUP SYSTEM

CROSS-REFERENCE TO RELATED APPLICATION

This application claims the benefit of Korean Patent Application No. 2002-65182, filed on Oct. 24, 2002 in the Korean Intellectual Property Office, the disclosure of which is incorporated herein in its entirety by reference.

BACKGROUND OF THE INVENTION

1. Field of the Invention

The present invention relates to a monitor photo diode (PD) of an optical pickup system, and more particularly, to an apparatus for and a method of controlling a monitor PD that enhances the performance of the monitor PD by controlling a dynamic range of the monitor PD.

2. Description of the Related Art

An optical pickup system is generally used to write data on or read data from an optical disk. In particular, such an optical pickup system uses light emitted from a laser diode (LD) and having a predetermined power to write data on, read data from, or erase data from the optical disk. A monitor photo diode (PD) or a front PD (FPD) monitors light power emitted from the LD and feeds back monitoring results to an optical power controller. The optical power controller adjusts the power of the LD based upon optical power information derived from the monitoring results fed back thereto from the monitor PD.

Figure 1:
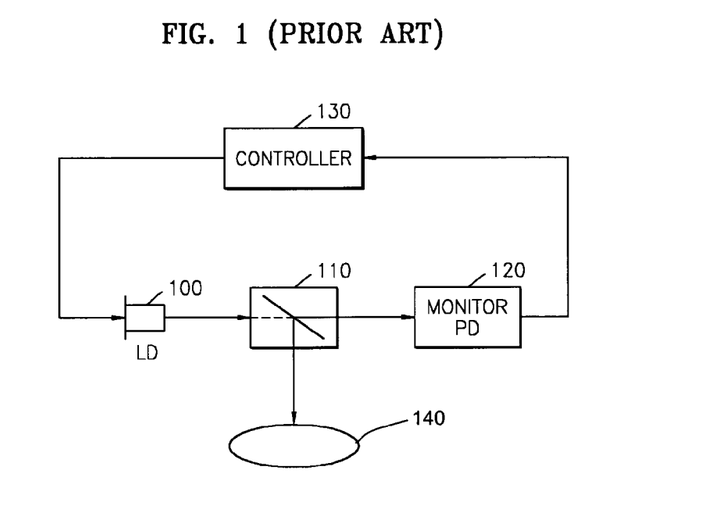
FIG. 1 is a block diagram of a typical optical pickup system.

FIG. 1 is a block diagram of an optical pickup system. Referring to FIG. 1, the optical pickup system includes an LD 100, an optical device 110, a monitor PD 120, and a controller 130. In order to write data on or read data from an optical disk 140, the controller 130 transmits an electrical signal to the LD 100. The LD 100 outputs an optical signal corresponding to the power of the received electrical signal. Most of the output optical signal, for example, 90%, is emitted toward the optical disk 140 via the optical device 110. A remainder of the output optical signal, in this example, 10%, is input to the monitor PD 120. The monitor PD 120 converts the optical signal received via the optical device 110 into an electrical signal and feeds back the electrical signal to the controller 130. The controller 130 adjusts the power of the electrical signal transmitted to the LD 100 based on the electrical signal fed back from the monitor PD 120. This process is called automatic power control (APC).

Figure 2A:
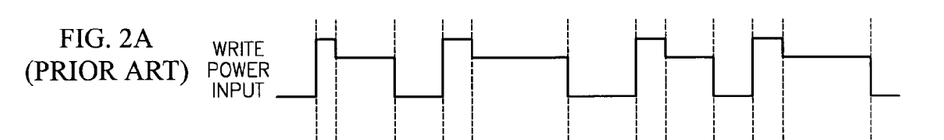
FIG. 2 is a diagram illustrating an optical power signal output to a laser diode (LD) and a signal output from a monitor photo diode (PD) in response to the optical power signal when writing data on an optical disk.
Figure 2B:
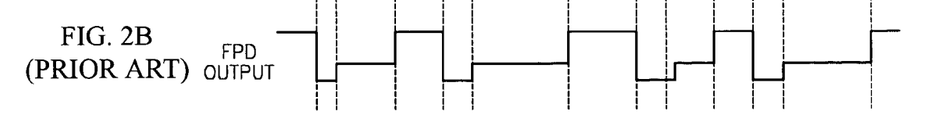

FIGS. 2A and 2B are diagrams illustrating an optical power signal transmitted to the LD 100 and a signal output from the monitor PD 120 in response to the optical power signal when carrying out a data writing process. When writing data on the optical disk 140, the LD 100 is overpowered with a highest level of power so as to be preheated. Thereafter, the LD 100 is given a write power, which is lower than the preheating power, and then a read power, which is lower than the write power. The monitor PD 120 outputs a signal having a predetermined gain and corresponding to the power applied to the LD 100 at any given time.

However, when the temperature of the LD 100 increases, the efficiency of outputting light generally decreases. Therefore, even though the optical pickup controller 130 commands that the LD 100 emit an optical signal having a constant level of intensity, an optical signal output from the LD 100 may have a lower intensity than expected due to the increase in the temperature of the LD 100. This is why the optical power controller 130 performs the APC process described above by making the monitor PD 120 keep monitoring optical power output to the LD 100 and feed back the monitoring results.

Figure 3:
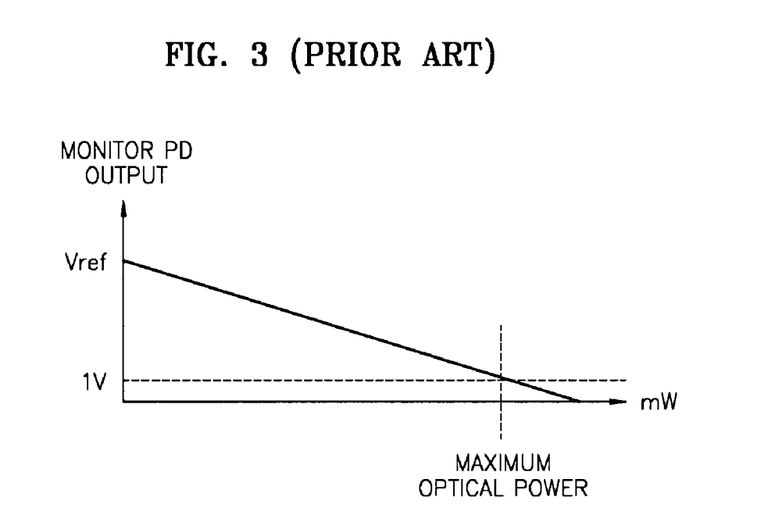
FIG. 3 is a graph illustrating a dynamic range of a monitor PD.

FIG. 3 is a graph illustrating a dynamic range of the monitor PD 120. When power applied to the LD 100 reaches a maximum, the output of a monitor PD 120 is expected to be a minimum. On the other hand, when the power applied to the LD 100 reaches a minimum, the output of the monitor PD 120 is supposed to be a maximum. The maximum power of the monitor PD 120 is a predetermined reference voltage Vref, and the minimum power of the monitor PD 120 is a predetermined cut-off voltage. The cut-off voltage of the monitor PD 120 (1V in general) is generally set in consideration of the maximum power (overpower in general) applied to the LD 100. Therefore, when the reference voltage Vref and the cut-off voltage are maintained at a predetermined level, the gradient of the graph of FIG. 3 varies depending on the type of an optical disk 140. For instance, the gradient is affected by the density of the optical disk 140, and data writing or reading speed, which are factors that directly affect the maximum power applied to the LD 100. In other words, when reading data from optical disks 140 having different data writing/reading speeds and different writing densities using an optical pickup system to which a fixed reference voltage is applied, the dynamic range of the monitor PD 120 of the optical pickup system varies.

For example, in the case of an optical disk 140 that requires a relatively higher optical power, the output of a monitor PD 120 varies considerably less depending on optical power. In this case, the dynamic range of the monitor PD 120 is lessened in response to variations in power output to an LD 100, thus degrading the precision of APC carried out by the optical pickup system.

SUMMARY OF THE INVENTION

The present invention provides an apparatus for and a method of controlling the dynamic range of a monitor photo diode (PD) depending on the intensity of optical power output to a laser diode (LD), which are capable of enhancing automatic power control (APC) precision of an optical pickup system.

Additional aspects and/or advantages of the invention will be set forth in part in the description which follows and, in part, will be obvious from the description, or may be learned by practice of the invention.

According to an aspect of the present invention, an optical pickup system, which outputs and controls power that drives a laser diode (LD), includes a monitor photo diode (PD) which selects an output gain depending on a type of power that drives the LD.

According to another aspect, the monitor PD has different gains for when a command is issued to output preheating overpower to the LD and when a command is issued to output a write or a read power to the LD.

According to yet another aspect, the monitor PD is set to have a gain and to substantially output a predetermined cut-off voltage for preheating overpower when the command is issued to output preheating overpower to the LD.

According to still another aspect, the monitor PD is set to have a gain and to substantially output a predetermined cut-off voltage for write power when the command is issued to output a write or a read power to the LD.

According to still yet another aspect, the monitor PD has a greater gain when the command is issued to output a write or a read power to the LD than when the command is issued to output preheating overpower to the LD.

According to a further aspect, a gain is selected using a power enable signal transmitted from an optical pickup controller for driving the LD.

According to a still further aspect, the gain is selected using an overpower enable signal.

According to another aspect of the present invention, an apparatus for controlling a monitor PD, which monitors an optical power signal output for writing data on or reading data from a disk, includes a comparator which compares a voltage signal corresponding to the optical power signal output from the LD with a predetermined reference voltage signal; and a gain selector which selectively issues a gain output from the comparator according to the type of the optical power signal output from the LD.

According to another aspect, the apparatus further includes an output unit which adjusts a level of a signal output from the comparator to be compatible with a level of a signal input to an optical pickup controller and outputs the level-adjusted signal.

According to still another aspect, the gain selector differentiates between when a command is issued to output preheating overpower to the LD and when a command is issued to output a write or a read power to the LD, and issues a different gain for each of the issued commands.

According to yet another aspect, the gain selector issues a gain so that a predetermined cut-off voltage is output for overpower when the command to output overpower to the LD is issued.

According to yet still another aspect, the gain selector issues a gain so that the cut-off voltage is output for a write or a read power when the command to output the write or the read power to the LD is issued.

According to a further aspect, the gain selector operates such that a greater gain is issued when the command is issued to output a write or a read power to the LD than when the command is issued to output a preheating overpower to the LD.

According to a still further aspect, if a power enable signal for driving the LD is input to the LD from an optical pickup controller, the gain selector issues a gain for the overpower, and otherwise, the gain selector issues a gain for the write or the read power.

According to yet still further aspect, the power enable signal is an overpower enable signal input into the LD from the optical pickup controller.

According to another aspect of the present invention, an optical pickup system, which outputs and controls an optical power used for driving an LD, includes a monitor PD which selects a first gain depending on the type of a disk to be driven in response an input signal, and selects a second gain other than the first gain depending on the optical power used for driving the LD.

According to another aspect, the first gain selected by the monitor PD varies depending on whether the disk is a CD or a DVD, and the second gain selected by the monitor PD varies depending on whether a command is issued to output a preheating overpower to the LD or a command to output a write or a read power to the LD.

According to still another aspect, the monitor PD determines the second gain so that a predetermined cut-off voltage is output for overpower when the command is issued to output overpower to the LD.

According to yet another aspect, the monitor PD determines the second gain so that the cut-off voltage is output for a read or a write power when the command is issued to output read or write power to the LD.

According to still another aspect, the monitor PD selects a greater second gain when the command to output a write or a read power to the LD than when the command is issued to output an overpower to the LD is issued.

According to still yet another aspect, the second gain is selected using a power enable signal transmitted from an optical pickup controller for driving the LD.

According to a further aspect, the second gain is selected using an overpower enable signal transmitted from a controller.

According to another aspect of the present invention, an apparatus for controlling a monitor PD, which monitors an optical power signal output for writing data on or reading data from a disk, includes a comparator which compares a voltage signal corresponding to the optical power signal output from the LD with a predetermined reference voltage signal; a medium gain selector which selectively issues a gain to the comparator depending on the type of the disk; and an operation gain selector which selectively issues output gains to the comparator depending on the type of the optical signal output from the LD, the output gains being multiplied by the output of the medium gain selector.

According to another aspect, the medium gain selector issues an appropriate gain depending on whether the disk is a CD or a DVD.

According to still another aspect, the operation gain selector issues different gains for when a command to output preheating overpower to the LD is issued and when a command is issued to output a write or a read power to the LD.

According to yet another aspect, the operation gain selector issues a gain so that a predetermined cut-off voltage is output for overpower when the command is issued to output overpower to the LD.

According to yet still another aspect, the operation gain selector issues a gain so that the cut-off voltage is output for a write or a read power when the command is issued to output a write or a read power to the LD.

According to a further aspect, the operation gain selector operates in such a manner that a greater gain is provided when the command is issued to output a write or a read power to the LD than when the command is issued to output a preheating overpower to the LD.

According to a still further aspect, if a power enable signal for driving the LD is input to the LD from an optical pickup controller, the operation gain selector provides a gain for an overpower, and if the power enable signal is not input to the LD, the operation gain selector provides a gain for a write or a read power.

According to a yet further aspect, the power enable signal is an overpower enable signal input to the LD from the optical pickup controller.

BRIEF DESCRIPTION OF THE DRAWINGS

These and/or other features and advantages of the present invention will become more apparent and more readily appreciated by describing in detail exemplary embodiments thereof with reference to the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
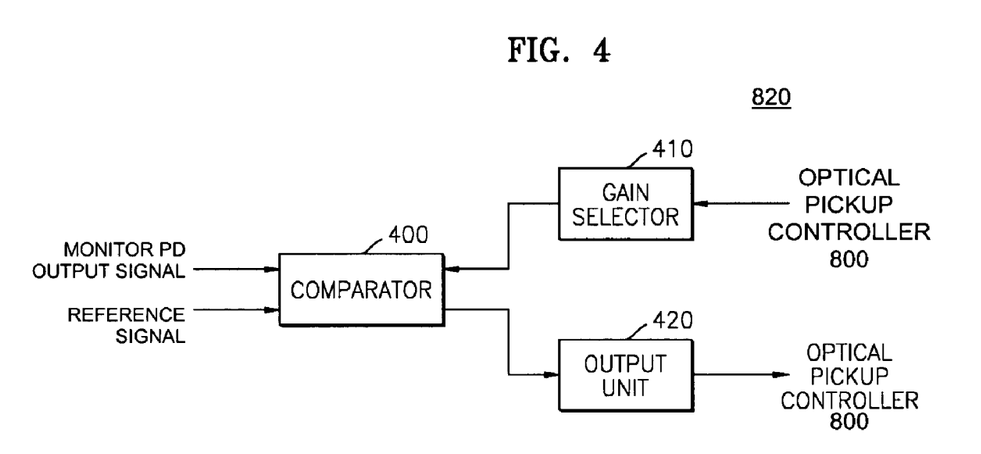
FIG. 4 is a block diagram illustrating an apparatus for controlling a monitor PD of an optical pickup system according to an embodiment of the present invention.
Figure 8:
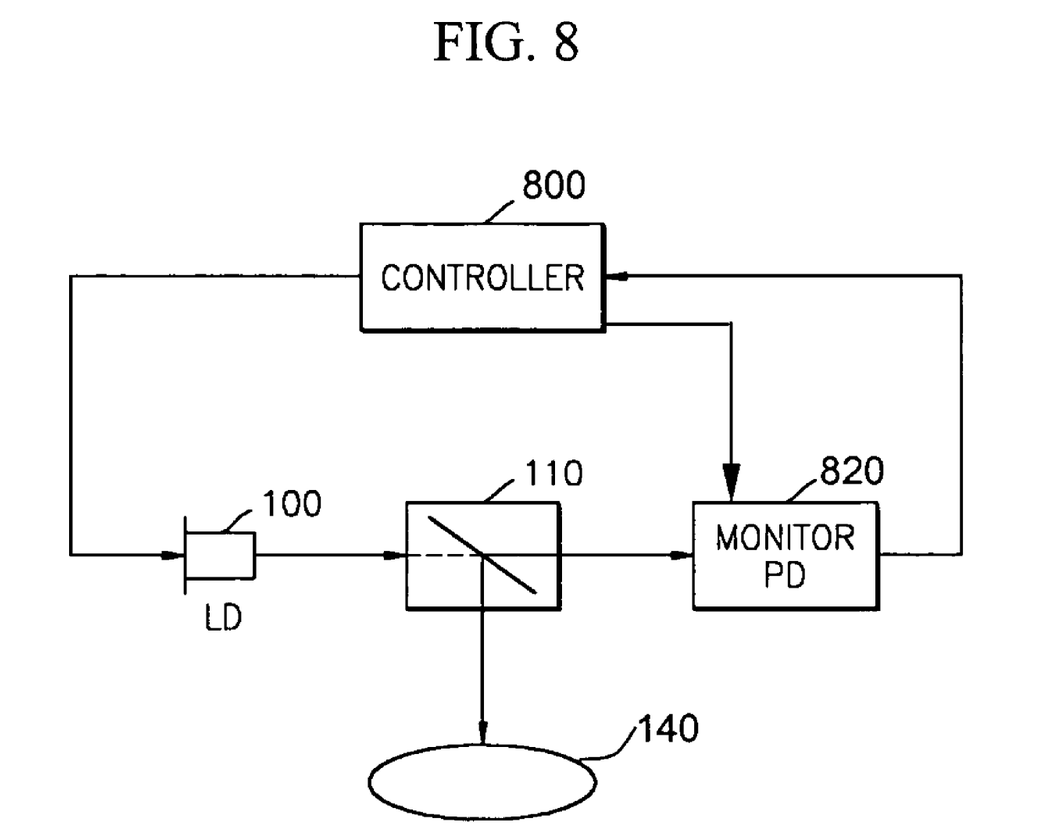
FIG. 8 is a block diagram of an optical system according to an aspect of the invention.

FIG. 4 is a block diagram of an embodiment of an apparatus 820 for controlling a monitor photo diode (PD) for use in an optical system such as that shown in FIG. 8. The apparatus 820 includes a comparator 400, which compares a power signal corresponding to a laser diode (LD) optical power output signal with a predetermined reference voltage signal. A gain selector 410 selectively provides output gains to the comparator 400 depending on the type of the LD optical power output signal. In addition, the apparatus further includes an output unit 420, which adjusts a level of a signal output from the comparator 400 depending on the level of an optical pickup controller input signal and then outputs the level-adjusted signal. However, it is understood that the output unit 420 is not required in all aspects of the present invention.

The comparator 400 receives a monitor PD output signal, which is proportional to the LD optical power output signal, and a predetermined reference signal. Thereafter, the comparator 400 compares the two input signals, multiplies the comparison result by a gain from the gain selector 410, and outputs the multiplication result.

The gain selector 410 identifies whether the optical power signal output to the LD is a write signal, a read signal, or an overpower signal for preheating the LD (not shown). The gain selector 410 selects a different gain for each of the different optical power signals, and provides the selected gain for each of the different optical power signals to the comparator 400.

According to an aspect of the invention, the gain selector 410 provides a gain for the comparator 400 according to an overpower enable signal input to an LD driver (not shown) of an optical pickup system. In other words, if the overpower enable signal is generated by an optical pickup controller 800 shown in FIG. 8, which is also input to the LD driver (not shown), the gain selector 410 selects a first gain of the comparator 400 appropriate for an overpower signal. Otherwise, of the overpower enable signal is not generated, the gain selector 410 provides one or more others gains to the comparator 400 appropriate for other optical power signals. Examples of such other optical power signals include a write signal and a read signal.

When an LD driving signal is output from the LD driver for a write signal or a read signal, the intensity of the LD driving signal is lower than that of an overpower signal. Therefore, a maximum optical power value that is related to the operation of a monitor PD may be lowered when the write or read signals are used as compared to when the overpower signal is used as shown graphically in FIG. 5.

Figure 5:
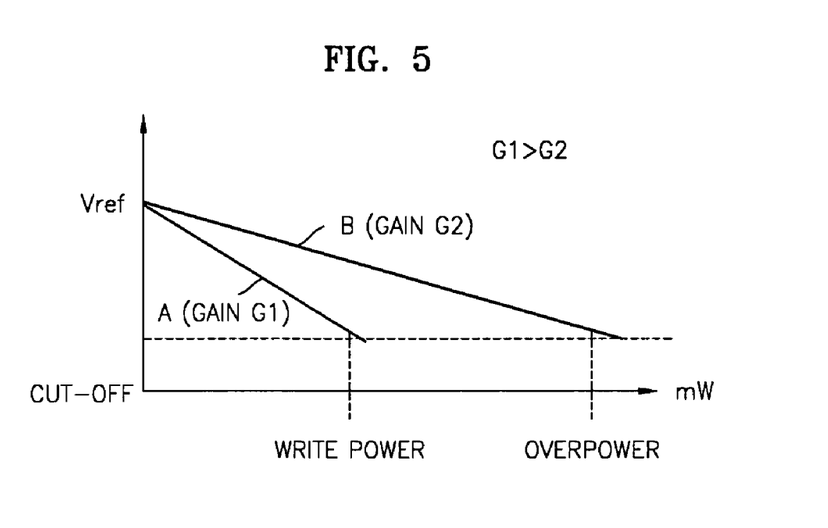
FIG. 5 is a graph illustrating operations of a monitor PD when an LD driving signal is a write signal (A) and when the LD driving signal is a read signal (B)

FIG. 5 is a graph illustrating operations of a monitor PD when an LD driving signal is for a write or a read signal (A) and when the LD driving signal is for an overpower signal (B). Referring to FIG. 5, in a case where an LD output optical power is supposed to be used for writing data on or reading data from an optical disk, a voltage for a write power should be considered as a minimum voltage output from a monitor PD. When there is no optical power output from the LD, a maximum voltage output from the monitor PD is maintained at a reference voltage Vref. When a write power is output from the LD, the monitor PD is controlled using signal (A) and a voltage is at least maintained at a cut-off voltage corresponding to the write power. In contrast, when the LD output optical power is overpower, the monitor PD is controlled using signal (B) so that the voltage of the monitor PD can be maintained at the cut-off voltage corresponding to the overpower.

As such, even when an input voltage (i.e., a voltage corresponding to the LD drivable optical power) has a wide variation range with respect to a possible range of output voltage between the cut-off voltage and a reference voltage, the output of the apparatus for controlling will not have any negative influence on control of an optical pickup system because the optical power does not need to be fed back to an optical pickup controller 800 shown in FIG. 8 even though overpower is output from an LD 100. When a write power or a read power is output from the LD 100, however, the output voltage of the apparatus is fed back to the optical pickup controller 800 shown in FIG. 8. In this case, the narrower the range of an optical power range corresponding to the minimum voltage or the cut-off voltage, the better the output of a monitor PD is reflected into write power variations.

Figure 6:
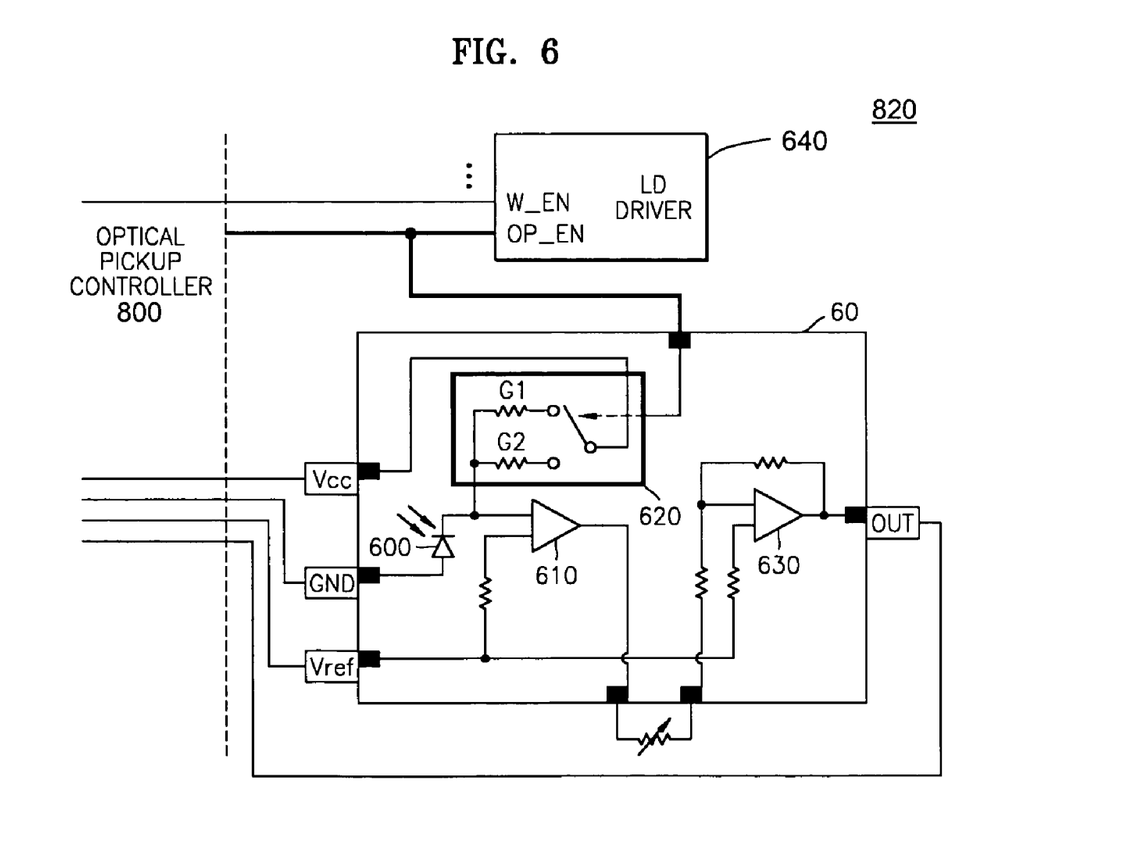
FIG. 6 is a circuit diagram of an apparatus for controlling gains of a monitor PD according to an embodiment of the present invention.

FIG. 6 is a circuit diagram of an apparatus 820 for controlling gains of a monitor PD according to an embodiment of the present invention. Referring to FIG. 6, the apparatus for controlling gains of a monitor PD can be implemented as one chip 60. The chip 60 includes a monitor PD 600, a first comparator 610, a gain selector 620, and a second comparator 630. The monitor PD 600 receives a predetermined percentage of light in proportion to optical power output from the LD 100 shown in FIG. 8. In other words, a voltage signal corresponding to the output optical power is generated at a cathode port of the monitor PD 600.

The first comparator 610 receives the voltage signal generated at the cathode port of the monitor PD 600 and a predetermined reference voltage Vref, as first and second input signals, respectively. The first comparator 610 outputs a difference between the first and second input signals. When the LD 100 does not output an optical power, the first comparator 610 outputs the reference voltage Vref. On the other hand, when the LD outputs maximum optical power, the first comparator 610 outputs a minimum voltage or a cut-off voltage.

The gain selector 620 includes selection circuits. In the shown embodiment, the selection circuits respectively select gains using a switch for different situations, such as for a case where the LD 100 outputs an overpower and another case where the LD outputs a write power or a read power. The selection circuits affect gains G1, G2 output to the first comparator 610. A gain G2 is adjusted so that the first comparator 610 outputs a minimum cut-off voltage of, for example, 1V, when the overpower is output from the LD 100. When the write or the read power is output from the LD to the monitor PD 600, the gain G1 is adjusted so that the first comparator 610 outputs the minimum cut-off voltage of, for example 1V. The dependence of the output gain of the first comparator 610 on the gain selector 620 switching selection circuits is apparent in FIG. 5.

A gain selection signal output from the gain selector 620 may be provided from an optical pickup controller 800 to an LD driver 640 as an optical power signal. A signal indicating whether optical power to be input to the LD driver 640 is write power, read power, or preheating power is input to the LD driver 640. When a preheating power signal is input to the LD driver 640, it can also serve as a gain selection signal of the gain selector 620. In most cases, the gain selector 620 is prepared to generate write or read gains. However, when a preheating power signal is enabled, the gain selector 620 switches the selection circuits so that the overpower gain can be generated.

The second comparator 630 amplifies the output of the first comparator 610 and feeds back the amplified output of the first comparator 610 to the optical pickup controller 70. The output of the second comparator 630 is proportional to the optical power output from the LD.

Figure 7:
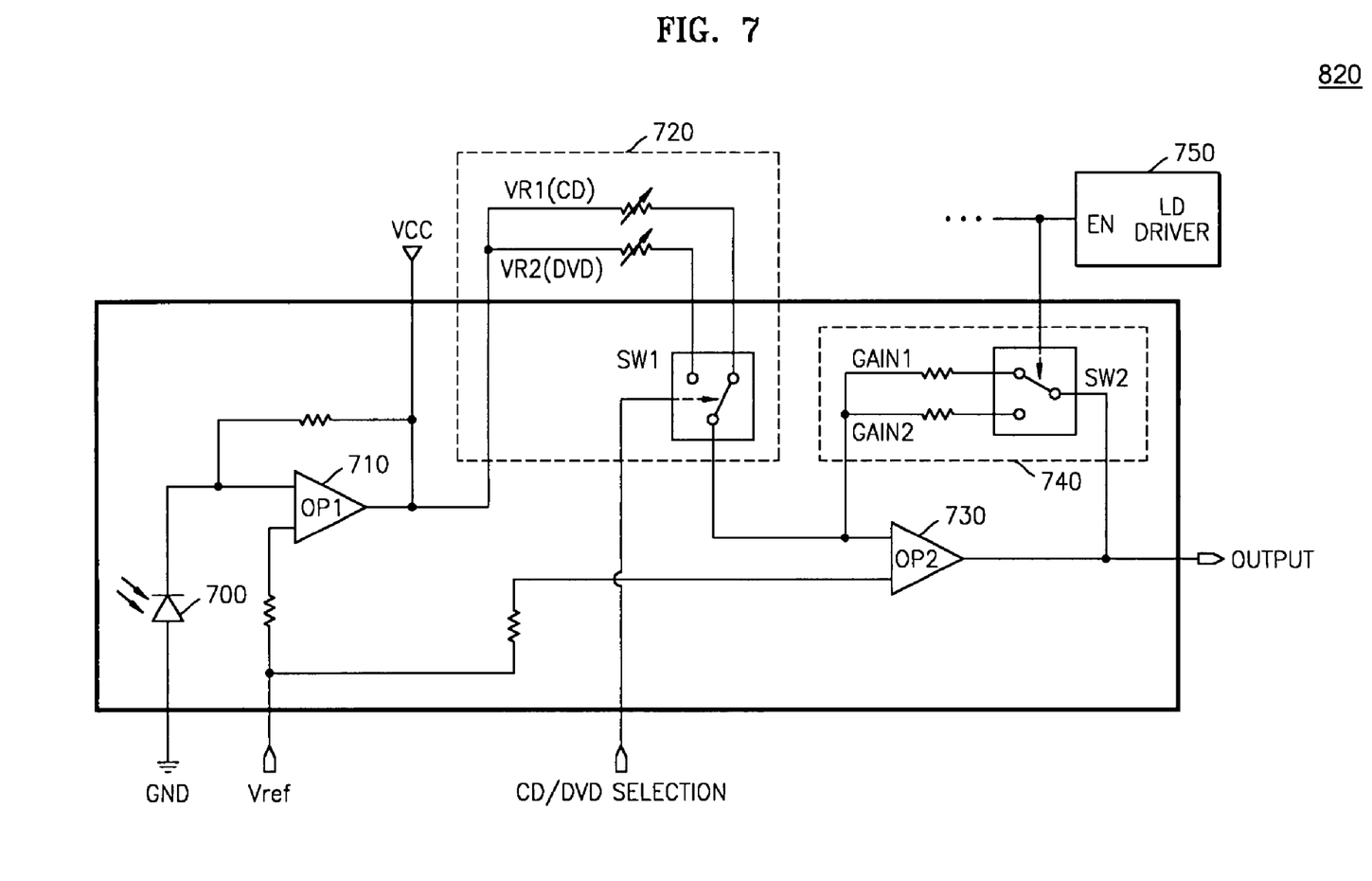
FIG. 7 is a circuit diagram of an apparatus for controlling gains of a monitor PD according to another embodiment of the present invention.

FIG. 7 is a circuit diagram of an apparatus for controlling a monitor PD according to another embodiment of the present invention. The apparatus includes a monitor PD 700, a first comparator 710, a medium gain selector 720, a second comparator 730, and an operation gain selector 740. The apparatus for controlling a monitor PD of FIG. 7 is different from the counterpart apparatus shown in FIG. 6 in that a gain for the monitor PD 700 is further determined depending on the type of a recording medium. In the shown embodiment, the gain depends on whether the recording medium is a CD or a DVD. However, it is understood that the gain could be based on other optical characteristics, or on other recording media.

The monitor PD 700 receives a predetermined percentage of light in proportion to optical power output from an LD (not shown). In other words, a voltage signal corresponding to the output an optical power is generated at a cathode port of the monitor PD 700. The first comparator 710 receives the voltage signal generated at the cathode port of the monitor PD 700 and a predetermined reference voltage Vref, as first and second input signals, respectively, and outputs a difference between the first and second input signals. When the LD 100 does not output an optical power, the first comparator 710 outputs the reference voltage Vref. When the LD 100 outputs maximum optical power, the first comparator 710 outputs a minimum voltage or a cut-off voltage.

The medium gain selector 720 selects an output gain value for the first comparator 710 depending on the type of optical disk 140 from which data will be read or on which data will be written. In the shown embodiment, the medium gain selector 720 selects the output gain depending on whether the recording medium is a CD or a DVD. A gain value VR1 for a CD and a gain value VR2 for a DVD are each set to a predetermined optimum value when a pickup device is designed.

The second comparator 730 compares the output of the first comparator 710, obtained based on the gain value selected by the medium gain selector 720, with the reference voltage Vref and outputs a difference therebetween. The operation gain selector 740 includes selection circuits. The selection circuits each select a switching direction for two different situations. In the shown embodiment, the selection circuits select for the case where the LD 100 outputs overpower and for the case where the LD 100 outputs the write power or the read power. The selection circuits affect gains output from the second comparator 720. A gain is adjusted so that the second comparator 720 outputs a minimum cut-off voltage of, for example, 1V, when overpower is output from the LD 100. When the write or the read power is output from the LD 100 to the monitor PD 700, the gain is adjusted so that the second comparator 720 outputs a minimum cut-off voltage of 1V. The dependency of operation gain of the second comparator 720 on the operation gain selector 740 switching the selection circuits is apparent in FIG. 5.

In the shown embodiment, a gain selection signal output from the operation gain selector 740 may be provided from an optical pickup controller 800 shown in FIG. 8 to an LD driver 750 as an optical power signal. In short, an output gain of the monitor PD 700 is determined depending on the type of optical disk 140 from which data will be read or on which data will be written (i.e., depending on whether the optical disk 140 is a CD or a DVD) and depending on whether the write or the read power or overpower is applied to the optical disk 140.

Since different maximum optical powers are provided for different writing media, i.e., a CD and a DVD, it is also preferable to determine an output gain of the monitor PD 700 depending on the maximum optical power. In addition, since overpower for preheating (an LD) for writing data on or reading data from a CD or a DVD is not monitored by an optical pickup controller, there is a need to differentiate a gain for overpower from a gain for write the or the read power. By doing so, the precision of pickup light that is monitored can be enhanced, thus enabling more precise APC.

In the related art as shown in FIG. 3, a dynamic operation range of a monitor PD 120 is determined based on overpower, which is a maximum optical power output from an LD 110. The write and read powers are then monitored within the dynamic range of the monitor PD 110. Thus, the output voltage of the monitor PD 120 seldom varies with respect to optical power, and accordingly, it is almost impossible to finely and precisely control an optical pickup control operation in response to optical power variations. However, in the present invention, a monitor PD 820 has different dynamic ranges for different situations, such as for the case where overpower is output from the LD 100 and for the case where the write or the read power is output from the LD 100, and for the write and read power that are fed back to an optical pickup controller 800, the monitor PD 820 outputs a value with a greater absolute gain. Therefore, it is possible to more precisely control the APC.

FIG. 8 shows an optical system according to an embodiment of the invention, the optical system includes an LD 100, an optical device 110, the monitor PD 820, and the controller 800. In order to write data on or read data from an optical disk 140, the controller 800 transmits an electrical signal to the LD 100. The LD 100 outputs an optical signal corresponding to the power of the received electrical signal. Most of the output optical signal, for example, 90%, is emitted toward the optical disk 140 via the optical device 110. A remainder of the output optical signal is input to the monitor PD 820. The monitor PD 820 receives the electrical signal sent to the LD 100 and converts the optical signal received via the optical device 110 into another electrical signal and feeds back the another electrical signal to the controller 800. The controller 800 adjusts the power of the electrical signal transmitted to the LD 100 based on the another electrical signal fed back from the monitor PD 820.

While not shown, it is understood that, according to an aspect of the invention, a light detector receives the light reflected from the optical disk 140 and the controller 800 detects data from the received light, performs control functions for adjusting a lens unit to focus the optical signal output from the LD 100 onto the optical disk 140, and controls a motor to rotate the optical disk 140 for use in recording and/or reproduction. Additionally, it is understood that the controller 800 can be one of a multitude of controllers that control the operation of the apparatus.

According to the present invention, it is possible to prevent the output of an optical pickup system from being reduced due to variations in the temperature of an LD, and to more precisely control an optical power output from the LD, by obtaining different operation gains for different situations, such as for the case where optical power for the preheating is output and for the case where an optical power for the writing data on or reading data from a recording medium is output.

In addition, it is also possible to more efficiently carry out LD power control by adjusting a gain for a monitor PD depending on the type of a disk and the type of operation performed on the disk.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for controlling a monitor photo diode, which monitors an optical signal output from a laser diode for writing data on or reading data from a disk, the apparatus comprising:
    a comparator which compares a voltage signal corresponding to a detected optical power output from the laser diode with a predetermined reference voltage signal;
    a medium gain selector which selectively issues a first gain selected from a first plurality of gains to the comparator depending on a type of the disk; and
    an operation gain selector which selectively issues a second gain selected from a plurality of output gains to the comparator depending on a type of the optical signal output from the laser diode so as to issue a monitoring signal according to the issued first and second gains for use in controlling the laser diode, the output gains being multiplied by the output of the medium gain selector.

2. The apparatus of claim 1, wherein the medium gain selector issues as the first gain a third gain when the disk is a CD and a fourth gain other than the third gain when the disk is a DVD.

3. The apparatus of claim 1, wherein the operation gain selector issues as the second gain a third gain when a command is issued to output a preheating overpower to the laser diode and a fourth gain other than the third gain when a command is issued to output a write or a read power to the laser diode.

4. The apparatus of claim 3, wherein the third gain is set so that a predetermined cut-off voltage is output when the detected optical power is substantially the overpower.

5. The apparatus of claim 3, wherein the fourth gain is set so that a predetermined cut-off voltage is output when the detected optical power is the write or the read power.

6. The apparatus of claim 1, wherein the operation gain selector selects a greater gain from the second plurality of gains when a command is issued to output a write or a read power to the laser diode than a gain issued when a command is issued to output a preheating overpower to the laser diode.

7. The apparatus of claim 1, further comprising an optical pickup controller that transmits a power enable signal for driving the laser diode, wherein if the power enable signal is input to the laser diode from the optical pickup controller, the operation gain selector provides a gain for an overpower, and if the power enable signal is not input to the laser diode, the operation gain selector provides another gain for a write or a read power.

8. The apparatus of claim 7, wherein the power enable signal is an overpower enable signal input to the laser diode from the optical pickup controller.

9. An optical recording and/or reproducing system including the apparatus for controlling the monitor photo diode of claim 1 and further comprising an optical pickup having the laser diode and a controller which controls the optical pickup to transfer data with respect to the disk and which drives the laser diode according to the monitoring signal.

* * * * *

UNITED STATES PATENT AND TRADEMARK OFFICE
CERTIFICATE OF CORRECTION

PATENT NO.       : 7,372,796 B2
APPLICATION NO.  : 10/687994
DATED            : May 13, 2008
INVENTOR(S)      : Jun-hyuk Lee et al.

It is certified that error appears in the above-identified patent and that said Letters Patent is hereby corrected as shown below:

Title Page, Item [75] Column 1 (Inventors), Line 3, change "Dong-ryul Lee" to --Dong-ryeol Lee--.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,372,796 B2 |
| APPLICATION NO. | : 10/687994 |
| DATED | : May 13, 2008 |
| INVENTOR(S) | : Jun-hyuk Lee et al. |

It is certified that error appears in the above-identified patent and that said Letters Patent is hereby corrected as shown below:

Title Page, Item [75] Column 1 (Inventors), Line 3, change "Dong-ryul Lee" to --Dong-ryeol Lee--.

Item [75] Inventors, "Chui-ho Jeon" should read --Chul-ho Jeon--.

This certificate supersedes the Certificate of Correction issued October 7, 2008.

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,372,796 B2  Page 1 of 1
APPLICATION NO. : 10/687994
DATED : May 13, 2008
INVENTOR(S) : Jun-hyuk Lee et al.

It is certified that error appears in the above-identified patent and that said Letters Patent is hereby corrected as shown below:

Title Page, Item [75] Column 1 (Inventors), Line 3, change "Dong-ryul Lee" to --Dong-gyeol Lee--.

Item [75] Inventors, "Chui-ho Jeon" should read --Chul-ho Jeon--.

This certificate supersedes the Certificates of Correction issued October 7, 2008 and December 9, 2008.

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,372,796 B2  Page 1 of 1
APPLICATION NO. : 10/687994
DATED : May 13, 2008
INVENTOR(S) : Jun-hyuk Lee et al.

It is certified that error appears in the above-identified patent and that said Letters Patent is hereby corrected as shown below:

Title Page, Item [75] Column 1 (Inventors), Line 3, change "Dong-ryul Lee" to --Dong-ryeol Lee--.

Item [75] Inventors, "Chui-ho Jeon" should read --Chul-ho Jeon--.

This certificate supersedes all previously issued Certificates of Correction.

Signed and Sealed this

Tenth Day of March, 2009

JOHN DOLL
*Acting Director of the United States Patent and Trademark Office*